May 2, 1961 R. P. COPELAND ET AL 2,982,237
EXTERNALLY SUSPENDED CAST REFRACTORY
Filed March 24, 1958 3 Sheets-Sheet 1
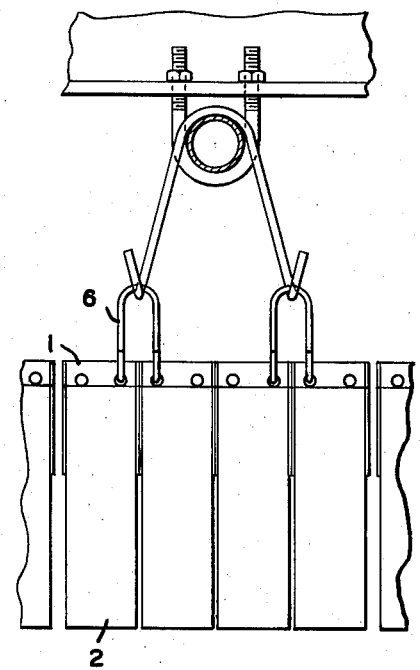
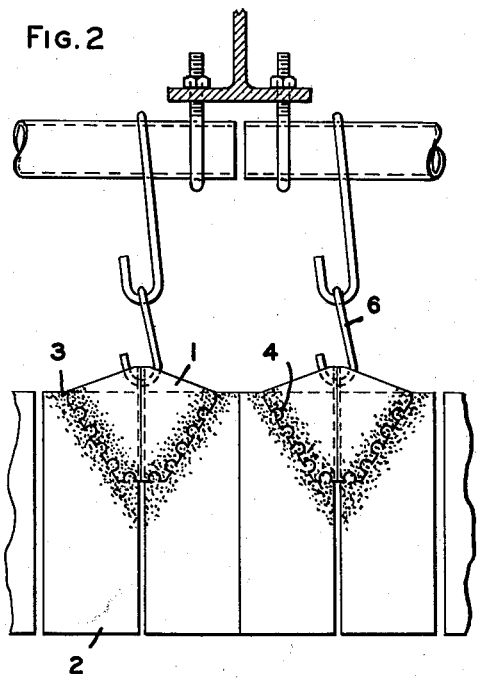
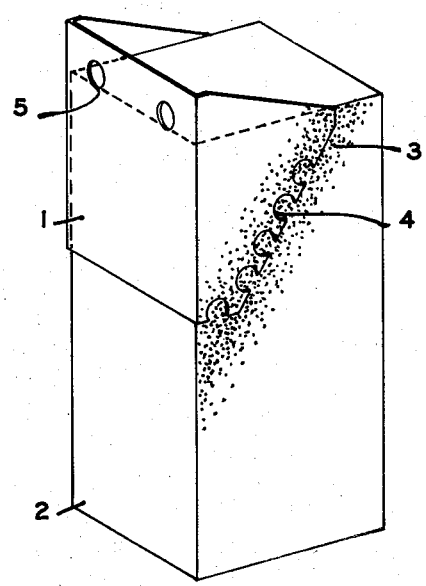
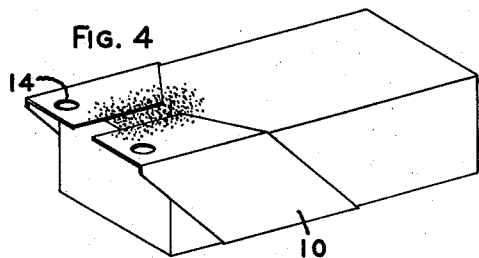
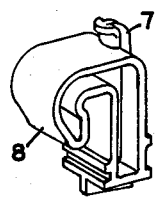
INVENTORS
ROBERT P. COPELAND
BY GEORGE P. REINTJES May 2, 1961 R. P. COPELAND ET AL 2,982,237
EXTERNALLY SUSPENDED CAST REFRACTORY
Filed March 24, 1958 3 Sheets-Sheet 2

INVENTORS
ROBERT P. COPELAND
GEORGE P. REINTJES
BY Kenneth M. Thorpe
Atty.

May 2, 1961  R. P. COPELAND ET AL  2,982,237
EXTERNALLY SUSPENDED CAST REFRACTORY
Filed March 24, 1958  3 Sheets-Sheet 3
FIG. 11
FIG. 10
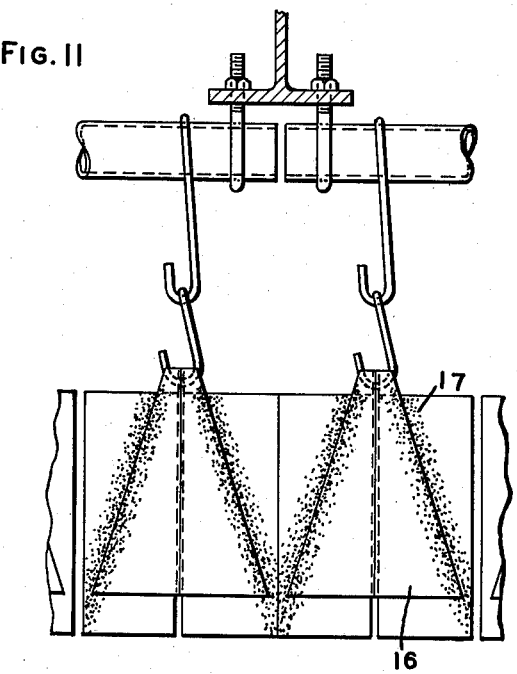
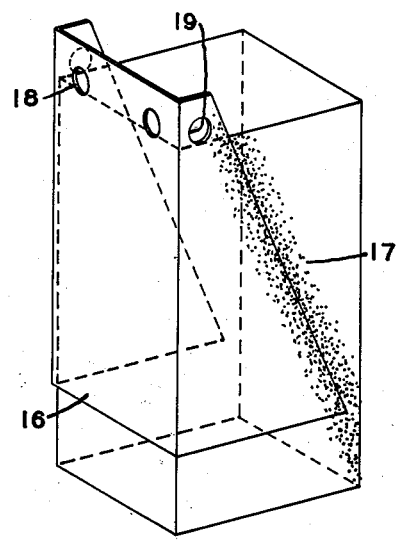
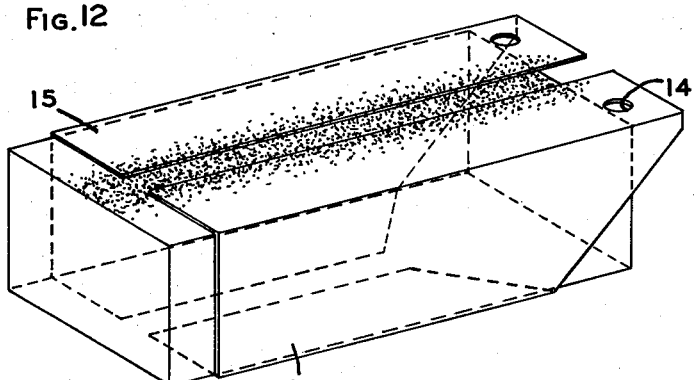
FIG. 12
FIG. 13
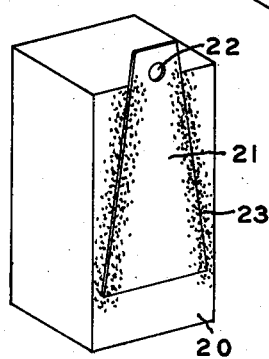
FIG. 14
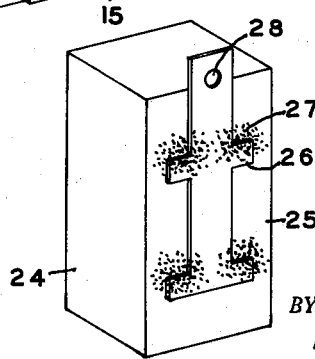
INVENTORS
ROBERT P. COPELAND
GEORGE P. REINTJES
BY Kenneth M. Thorpe
Atty.

United States Patent Office 2,982,237
Patented May 2, 1961

2,982,237

EXTERNALLY SUSPENDED CAST REFRACTORY

Robert P. Copeland, Independence, Mo., and George P. Reintjes, 2517 Jefferson St., Kansas City, Mo.; said Copeland assignor to said Reintjes Filed Mar. 24, 1958, Ser. No. 723,428

1 Claim. (Cl. 110—99)

The increase in size and in operating temperatures of industrial melting furnaces has led to the constant quest for better refractories for walls and arches to lessen maintenance costs. The best of refractories to date are limited by their inability to fully cope with expansion and contraction which causes spalling and failure of the refractories.

One of the objects of the present invention is to provide an external casing so formed that the inner ends of the refractories or tile where the casings are suspended back to back, are spaced apart to allow for expansion. Expansion and growth are absorbed in these spaces without mechanical pressures on adjacent refractory. Mechanical pressures and rapid chilling and cooling lead to spalling and shearing of the hot ends of the refractories.

Various methods of suspension have been tried in the past, some requiring holes in the sides of the refractory. For basic refractory, which are encased in metal, we have developed an external suspension which consists in supporting the refractory from an exposed or projecting end of the casing. This is described in pending application Serial No. 543,955, filed October 31, 1955 which is now abandoned.

The present invention consists in externally supporting any type of refractory which is compatible to the use of a metal casing, and particularly basic refractory chrome, magnesite and other basic materials. Some basics are formed by melting or fusing the raw materials at very high temperatures. These basic refractories up to the present time have usually been cast in large ingots and are later cut or sawn to size and shape. The hardness of the fused material is so great that they can only be worked, drilled, sawed or cut with diamond faced tools. Due to this hardness it is obvious that it is economically impractical to saw or cast blocks to exactly the same size in all dimensions so that the usual methods of applying metal casings cannot be followed.

In the endeavor to devise an efficient and practical method of attaching the metal casings to such refractories, we have discovered that the process commercially called metallizing or metal spraying provides sufficient bond of the sprayed metal to the refractory and to the metal casing as to develop or utilize the strength of the deposited metal and its bond to both the refractory block and to the metal casing, so that such an assembly can be suspended from a projecting end of the metal casing. Actual tests have shown that the strength of the deposited metal is several times that required to support the weight of the refractory block or tile. The exact composition of the sprayed metal, high or low carbon steel, stainless steel, etc., will vary with the strength desired and the temperature range to which it is exposed.

In the development of the suspension we have discovered that the casing may be applied in two methods, one in which the tensile strength of the deposited or sprayed metal is solely relied upon to prevent the refractory gravitating from the casing. In the other method, designed particularly for use with heavier refractory blocks, the weight of the refractory is opposed by what amounts to a shoulder of deposited meal or a fillet, which is firmly bonded to the refractory material. In this construction the refractory itself must be crushed before the deposited metal can be removed.

With the general objects named in view and others as will hereinafter appear, the invention consists in certain new and useful features of construction and organization of parts as hereinafter described and claimed and in order that it may be fully understood, reference is to be had to the accompanying drawings, in which:

Figure 1 is a fragmental section through a furnace arch illustrating a refractory embodying the suspension means of the invention.

Figure 2 is a section at right angles to Figure 1.

Figure 3 is a perspective view on an enlarged scale of a refractory such as shown in Figures 1 and 2.

Figure 4 is a perspective view of a modified construction.

Figure 5 is a perspective view of a hanger for the cantilever suspension of a refractory in a wall.

Figure 10 is a perspective view of a modified metal casing and refractory in which the deposited metal is loaded in shear, said casing also having side suspension openings.

Figure 11 is a reduced elevation of a roof.

Figure 12 is a perspective view of a metal casing of the type shown in Figures 4 and 8, but more extensively encasing the refractory block or tile.

Figures 13 and 14 are two modifications of the construction in which the deposited metal is placed or loaded in shear as also occurs in the serrated edge construction of Figures 2 and 3.

Figure 6:
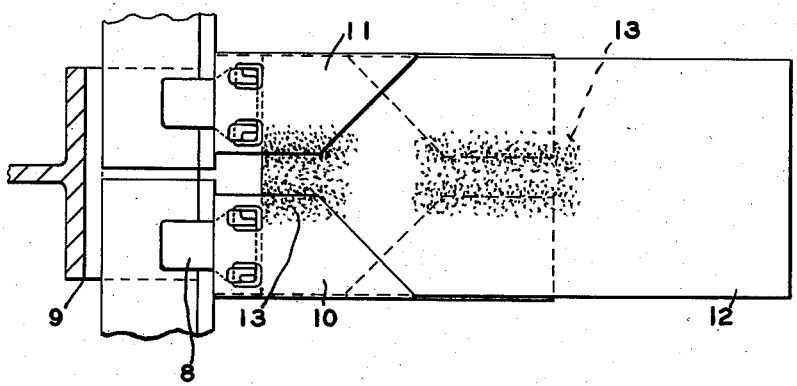
Figure 6 is a top plan view of a cantilevered refractory in which the casing comprises a pair of right and left hand members.

In carrying out the invention, the end of the refractory to which the suspension casing 1 is to be applied is preferably mechanically or chemically cleaned to open up the pores, remove all loose deposits and supply a dry, clean and non-oily surface. The metal casing 1 is preferably of U-shape to embrace three faces of one end of the refractory block 2. It is desirable that the distance between the opposite faces of the block fitted within the casing, shall be held constant so that a good tight fit will always occur when a preformed casing is used as this will avoid loss of time at the time of metal spraying.

After the casing has been fitted to the block, the molten metal 3 is pressure sprayed along the edges of the casing. It is to be noted that the edge of the casing may be serrated or formed with cut-outs as at 4 so that the cut-outs form shoulders facing both ends of the refractory increasing the linear area of contact and also to provide plugs of deposited metal which resist separation of the casing and block as they are subject to shearing action. The method described and illustrated is practical for the suspension of refractory inasmuch as the pressure sprayed metal is so finely atomized that it perfectly penetrates the pores or cavities of the refractory and metal casing as to provide a tight and strong mechanical bond. One end of the casing 2 projects beyond the refractory and is formed with one or more openings 5 to engage suspension hangers 6 when suspended in a roof or arch, or to hook over pintles 7 of hangers 8 which the tile is to be horizontally cantilevered from the framework 9 of a furnace as shown in Figures 6 and 7.

Figure 7:
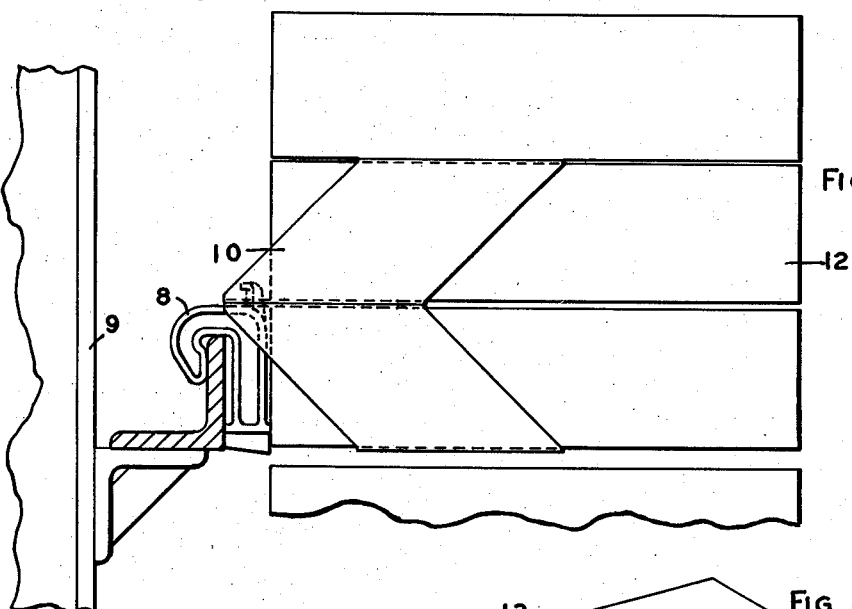
Figure 7 is a side elevation of the cantilevered construction shown in Figure 5.
Figure 9:
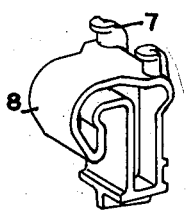
Figure 9 is a perspective view of a hanger adapted for use with the refractory of Figure 8.
Figure 8:
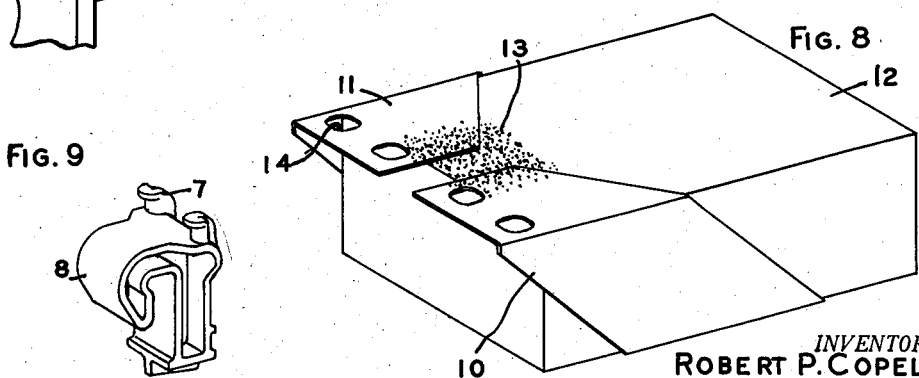
Figure 8 is a perspective view of the encased refractory shown in Figures 6 and 7.

In Figures 6, 7 and 8, a modified casing is shown, which is particularly adaptable for use with a refractory block which is wider than it measures vertically. The preferred casing in this construction comprises a right and left hand U-shaped casing 10 and 11, the legs of the U being spaced a predetermined distance to fit the vertical height of the block 12 which is held to desired tolerances. The opposed edges of the casings 10 and 11 along the top and bottom of the block are spaced apart and parallel the longitudinal axis of the block as shown in Figure 6. One end of the casings 10 and 11 project beyond the refractory where they are formed with one or more suspension openings 14 to engage the hangers 6 or 8.

In the construction shown in Figure 12, more particularly designed for tile or refractory of low strength, the metal casing 15 embraces substantially the full length of the refractory block. This construction is intended primarily for use in walls where the refractory is to be cantilevered from the furnace framework as shown in Figures 6 and 7.

In experimenting with the construction it was discovered that the deposited metal so firmly bonds to the refractory that separation is practically impossible except by fracture of the refractory block. This bond when placed in shear will resist a greater force than that of the tensile strength of the deposited metal alone. Therefore, when the refractory to be suspended is somewhat heavy, the metal casing of Figures 10 and 11 may be used. In this construction the wider end of the casing 16 is reversed in relation to its suspension end as compared with the construction shown in Figures 1 and 3. The deposited metal 17 is applied as shown. With this arrangement the deposited metal on the refractory forms a shoulder or fillet in opposition to the edge of the metal casing 16 which is placed in shear to resist longitudinal separation of the casing and refractory. The end of the casing 16 projects beyond the refractory and may be supplied with one or more suspension openings 18. In Figure 10, the two sides of the casing are shown with suspension openings 19, which may also be provided in the sides of the casings illustrated in the other figures of the drawings, if desired.

In Figures 13 and 14 alternative constructions are illustrated in which longitudinal separation of the refractory and the casing plate is resisted by placing the deposited metal in shear. In Figure 13, the block 20 is surfaced on one side with a casing 21 projecting at one end beyond the block and having a suspension opening 22. The side edges of the plate 21 diverge downwardly in relation to the longitudinal axis of the block and the deposited metal 23 extends lengthwise of said edges. In Figure 14, the block 24 is surfaced with a plate 25 having offsets 26 providing shoulders facing the suspension end of the block, the sprayed metal 27 being along the top edges of the offsets function similar to the cut-outs or serrations 4 of Figure 3, so that it is placed in shear to prevent longitudinal separation in a direction away from suspension opening 28.

From the above description and drawings, it will be evident that we have produced a construction embodying all of the features of advantage set forth as desirable; and while we have described and illustrated the preferred embodiment, it is to be understood that we reserve all right to changes within the spirit and scope of the appended claim.

We claim:

A composite refractory block for overhead suspension comprising a refractory block, a metal plate hanger suspension snugly embracing one face of the block and having a suspension end projecting above the face of the block and beyond one end of said block, said plate being formed to provide a shoulder directed toward the suspension end of the plate, and a deposited shoulder of weld metal bonded to the plate shoulder and to the face of the block immediately above said shoulder when in molten condition whereby the weight of the refractory block is applied to the deposited metal shoulder.

References Cited in the file of this patent

UNITED STATES PATENTS

| | | |
|---|---|---|
| 1,519,364 | Davidson | Dec. 16, 1924 |
| 2,187,669 | Stewart | Jan. 16, 1940 |
| 2,476,423 | Longenecker | July 19, 1949 |
| 2,674,788 | Kohl | Apr. 13, 1954 |
| 2,829,877 | Davis | Apr. 8, 1958 |

FOREIGN PATENTS

| | | |
|---|---|---|
| 502,488 | Belgium | Apr. 30, 1951 |
| 677,696 | Great Britain | Aug. 20, 1952 |